United States Patent [19]
Bruno et al.

[11] Patent Number: 6,020,915
[45] Date of Patent: *Feb. 1, 2000

[54] METHOD AND SYSTEM FOR PROVIDING AN ANALOG VOICE-ONLY ENDPOINT WITH PSEUDO MULTIMEDIA SERVICE

[75] Inventors: Richard Frank Bruno, Morristown; Howard Paul Katseff, Englishtown; Robert Edward Markowitz, Glen Rock, all of N.J.; Joseph Thomas O'Neil, Staten Island, N.Y.; Bethany Scott Robinson, Lebanon; Kenneth H. Rosen, Middletown, both of N.J.

[73] Assignee: AT&T Corp., New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/735,286

[22] Filed: Oct. 22, 1996

Related U.S. Application Data

[63] Continuation-in-part of application No. 08/495,747, Jun. 27, 1995, Pat. No. 5,710,591.

[51] Int. Cl.[7] ............................... H04N 7/14; H04M 3/42
[52] U.S. Cl. .............................................. 348/15; 379/202
[58] Field of Search .............................. 379/90.01, 93.01, 379/93.09, 93.21, 142, 201–202, 88–89, 93.14; 348/14–20; 370/389, 401, 402; 395/200.34, 200.35

[56] References Cited

U.S. PATENT DOCUMENTS

| | | | |
|---|---|---|---|
| H1714 | 3/1998 | Pasrtridge, III | 348/14 |
| 4,965,819 | 10/1990 | Kannes | 348/15 |
| 5,373,316 | 12/1994 | Ishinabe et al. | 379/93.21 |
| 5,450,123 | 9/1995 | Smith | 379/93.12 |
| 5,563,649 | 10/1996 | Gould et al. | 348/17 |
| 5,572,643 | 11/1996 | Judson | 379/89 |
| 5,610,975 | 3/1997 | Tsuchida | 379/93.17 |
| 5,684,527 | 11/1997 | Terui et al. | 379/202 |
| 5,689,553 | 11/1997 | Ahuja et al. | 379/202 |
| 5,710,591 | 1/1998 | Bruno et al. | 379/202 |
| 5,737,321 | 4/1998 | Takahashi | 379/202 |

*Primary Examiner*—Curtis A. Kuntz
*Assistant Examiner*—George Eng

[57] ABSTRACT

An enduser at a POTS analog voice-only endpoint (136) and endusers at H.320 standard multimedia terminals (101, 102, 103, 104), which each communicate over separate voice, video and data streams, engage in a videoconference with each other in a pseudo multimedia manner through a central platform (135) that provides call conversion capabilities. A document to be shared by a user at the POTS endpoint with users at the multimedia endpoints is transmitted as a data signal from a facsimile machine (137) or PC terminal (138) associated with the POTS user to a server (146) in the platform. The received data signal is then inputted to a multimedia bridge (124) and transmitted on the data stream to each multimedia endpoint for display on a window on each multimedia terminal. Similarly, a document to be shared by a multimedia endpoint is transmitted on a data stream to the multimedia bridge, where it is bridged on the data stream transmitted to the other multimedia endpoints and to the server. The document is then transmitted from the server to the facsimile machine or PC terminal associated with the POTS endpoint. In conventional multimedia conferencing arrangements, voice-activated switching is used to determine which user's video image is bridged onto the video stream transmitted to each multimedia terminal. When the audio signal from the POTS user would cause a video signal from that user's terminal to be bridged to all the multimedia endpoints if in fact that user was at a multimedia terminal, a stored image of that user is retrieved from a database (151) and outputted by the bridge on the video stream transmitted to each multimedia terminal to enable the multimedia participants to visually identify the presently talking enduser.

30 Claims, 3 Drawing Sheets

METHOD AND SYSTEM FOR PROVIDING AN ANALOG VOICE-ONLY ENDPOINT WITH PSEUDO MULTIMEDIA SERVICE

This is a continuation-in-part of Application Ser. No. 08/495,747, filed Jun. 27, 1995, now U.S. Pat. No. 5,710,591.

TECHNICAL FIELD

This invention relates to providing extended capabilities to an enduser at an analog voice-only endpoint to enable that user to interact with users at multimedia endpoints.

BACKGROUND OF THE INVENTION

Providing both multimedia (voice, video and data) communication products and services to customers is playing an increasingly important role for telecommunications companies today. The power of multimedia communications is evident from the expansion in "videoconferencing", in which a user at a videoconferencing station can communicate "face-to-face" in real time with persons at other videoconferencing stations. The introduction of desktop videoconferencing equipment is making multimedia communications even more prevalent. Generally, multimedia communications uses equipment incorporated as part of a general purpose computer, or integrated systems specifically designed for the task. Various multimedia products are available that enable users to exchange audio, video, and data through their PCs with one another by communicating over ISDN phone lines or over switched 56 kbps phone lines. An MS-Windows™-based teleconferencing application enables a user to place a multimedia phone call to one or a plurality of other similarly equipped PCs through a bridge known as a Multimedia Control Unit (MCU). The interconnected users are then able to engage in a video teleconference phone call with the camera input of one user appearing in a window on the PC of all the other users. The image of the particular participant that is displayed in the window on each user's PC will generally change in accordance with the dynamics of the conference such as selecting for display to all the participants, the video input from the one participant whose audio signal is loudest. In addition to the exchange of audio and video, data can also be shared between the users either by the exchange of files or through the use of shared applications running simultaneously on the connected PCs. Thus, for example, a document originating at one user's terminal can be displayed on another window on each of the other users' terminals.

Generally the multimedia equipment used for such teleconferencing conforms to the H.320 protocol that has been adopted by the International Telecommunications Union (ITU) as an international standard for videoconferencing. The H.320 standard is a family of videoconferencing standards developed and maintained by the ITU which encompasses a variety of standards for audio compression, video compression, and telephone call set-up and control. The H.320 standard provides for the division of information into three distinct streams: video, audio, and data, where "data" herein is intended to mean digital information that is not meant to be displayed as real-time video or audio, and includes information to be displayed as text, such as documents, and data that is used to control applications or convey status to them. A PC operating in accordance with the H.320 standard is thus constrained to communicate only with one or more similar devices operating under the same standard.

In order to allow a Plain Old Telephone Service (POTS) end-user who does not have an H.320 compatible terminal to participate, albeit in a limited fashion, in a videoconference with users having H.320 compatible terminals, an audio port is connected to an MCU configured in accordance with the H.320 standards. An end-user, connected to the audio port over a POTS connection, is then able to participate in the audio portion of the conference call, by listening to the audio portion of the ongoing conference and providing audio input to the conference. Of course, without the multimedia capabilities of an H.320 compatible terminal, the functionality of a voice-only endpoint is severely limited, since neither data in the form of documents can be received, nor can video images from any of the other participants. This in turn limits the functionality available to the users at the multimedia endpoints who in turn can neither see the voice-only caller, nor receive or send data in the form of documents that might need to be shared with the user at the voice-only endpoint.

An object of the present invention is to provide a system and a method for expanding the functionality of an analog voice-only non-H.320 compatible endpoint.

SUMMARY OF THE INVENTION

In accordance with the present invention, improved functionality between a POTS endpoint and an H.320 multimedia endpoint, which communicates over separate voice, video and data streams, is provided through a central platform that provides call conversion capabilities. This platform, in addition to providing conventional voice, video, and data interconnectivity between the multimedia endpoints connected thereto for a videoconference, enables an analog voice-only endpoint to participate in a limited manner in a multimedia videoconference with the multimedia users through the MCU bridging apparatus. In particular, in accordance with the invention, data interconnectivity between a voice-only endpoint and the H.320 multimedia endpoints is achieved, as well as limited video interconnectivity.

With respect to data interconnectivity, a data signal representing a document to be shared between the participants of a videoconference is outputted on the data stream component of the output signal of an originating H.320 multimedia endpoint and transmitted to the MCU. The MCU delivers that document, in the form of the data signal, on its data stream output that is transmitted to each of the other multimedia endpoints. In accordance with the invention, that data signal is also delivered by the MCU, through a server, to a data terminal, such as a facsimile machine or PC terminal, associated with the analog voice-only endpoint. In a similar manner, a data signal representing a document to be shared by the analog voice-only user is outputted by the analog user's data terminal and transmitted to the platform, where it is provided to the MCU and outputted on the data stream component of the H.320 signal transmitted to each multimedia endpoint.

Limited video capabilities between the analog voice-only endpoint and the H.320 multimedia endpoint are also provided by the platform. Once the analog voice-only user is identified, a database which stores images of those analog voice-only users who may use this service is accessed to retrieve the particular current analog voice-only user's image. That image is then available to the MCU for visual identification of that user as a static image on the video stream provided by the MCU to each multimedia endpoint. That image is then outputted on the video stream transmitted to each multimedia endpoint during the videoconference when the MCU would select the analog voice-only user's image for display to the videoconference participants using, for example, voice-activated switching.

Messaging services available to multimedia users are similarly extended to the analog voice-only endpoint. Thus, a call from an analog voice-only endpoint directed to a multimedia endpoint which is busy or which didn't answer is directed to a multimedia messaging server for call completion. The user's stored image identifier is then provided on the video stream of a multimedia signal sent to a multimedia messaging server. That video stream is transmitted to the messaging server together with a voice message on the audio stream and, on the data stream, any documents that the analog voice-only caller wants to send to the multimedia user. The called multimedia user can later retrieve from the messaging server, the multimedia message comprising the voice message, the image of the caller, and the attached documents.

DETAILED DESCRIPTION

Figure 1:
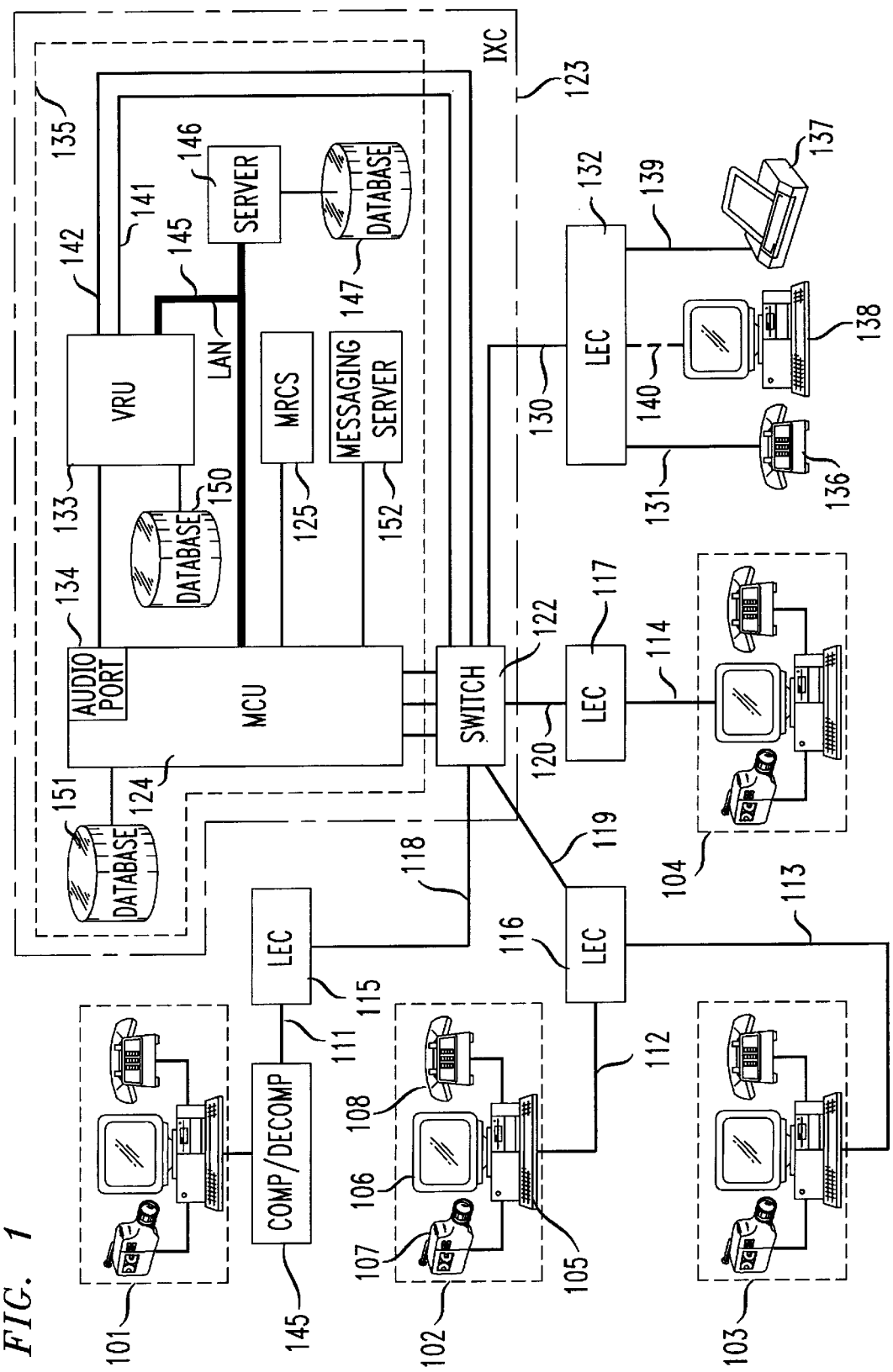
FIG. 1 is a block diagram of a simplified telecommunications network in accordance with a first embodiment of the present invention in which data signals are transmitted to and from an analog voice-only endpoint via a separate telephonic connection.

With reference to FIG. 1, a simplified telecommunications network in accordance with the present invention is shown. It should be recognized that the network of FIG. 1 includes other elements, which have been eliminated in order to simplify the figure and which are not necessary for an understanding of the present invention disclosed herein.

The network shown includes plural multimedia terminals 101, 102, 103 and 104. Of course, an actual network would include many more such terminals, which can communicate with each other in a multimedia fashion over separate audio, video and data streams. Each multimedia terminal is compliant with the H.3XX compliant protocols (e.g., H.320), such as Intel's ProShare terminal. As shown illustratively for terminal 102, each terminal generally includes a processing unit 105, a CRT 106 and a camera 107. A multimedia terminal 102 may also include an associated telephone 108 located external to the processing unit 105 for purposes of dialing another terminal's telephone number when the processing unit 105 is incapable of doing so directly. The processing unit 105 may be a general purpose computer with multimedia capable equipment incorporated therein, which allows a conventional PC to perform video and ISDN communications that are compliant with the H.320 protocol. Alternatively, the processing unit may be a multimedia specific device.

The H.320 compliant multimedia terminals 101, 102, 103, and 104 are designed to communicate over ISDN or switched 56 kbps facilities. Thus each communications link 111, 112, 113, and 114 which connects terminals 101, 102, 103, and 104, respectively, to the Public Switched Telephone Network may be an ISDN Basic Rate Interface (BRI) phone line or switched 56 kbps line(s). As related to the communications link over which an H.320 multimedia terminal communicates, the ISDN BRI phone line and the switched 56 kbps line(s) will be referred to herein in the alternative as the "bearer channel". If the bearer channel is an ISDN BRI line, the channel consists of the conventional ISDN 2B+D channels in which the two B channels (where a B channel has a bandwidth of 64 kbps) are used for providing separate data, audio and video streams. In a preferred implementation, the video stream is at 64 kbps, the audio stream is at 16 kbps, and the data stream is at 32 kbps. If the bearer channel is a switched 56 kbps facility, the preferred embodiment would incorporate two 56 kbps lines, with the video, audio and video streams being divided into the three streams as defined above for the ISDN line. The H.320 terminal is also capable of operating over a single 56 kbps switched line in which for maximum data transmission capability, the video and voice streams can be minimized. Furthermore, in setting up a multimedia call over ISDN or switched 56 kbps facilities, the allocation of bandwidth can be allocated to the audio, video and data streams in a flexible manner.

Links 111, 112, 113, and 114 are connected to switches within the Local Exchange Carriers (LECs) associated with each terminal. As shown in FIG. 1, terminal 101 is connected to LEC 115, both terminals 102 and 103 are connected to a common LEC 116, and terminal 104 is connected to LEC 117. Each LEC may include a 5ESS® switch manufactured by Lucent Technologies, Inc., or other switch. LECs 115, 116 and 117 are connected to a switch 122 within the Interexchange Carrier (IXC) switched network 123 by means of paths 118, 119 and 120, respectively, that may be ISDN Primary Rate Interface (PRI) lines consisting of 23B+D channels, T1 lines, switched 56 kbps lines, Asynchronous Transfer Mode (ATM) packet medium, or other digital transmission facilities. Switch 122 may be a 4ESS™ switch manufactured by Lucent Technologies, Inc. In normal multimedia communications, any of the H.320 compliant terminals 101, 102, 103 and 104, can communicate with each other, exchanging video, voice and data over the separate video, voice and data streams defined by the H.320 standard through a multimedia bridge, known as a Multimedia Control Unit (MCU) 124, connected to switch 122.

A multimedia platform 135 within IXC 123 performs the conventional H.320 standard bridging functions associated with the separate audio, video and data streams to and from each multimedia terminal 101, 102, 103 and 104, establishing a multimedia teleconference among the users at these terminals, and providing multimedia messaging services to the multimedia these users. In addition, platform 135, in accordance with the present invention, enables a user at an analog voice-only endpoint with only POTS service, such as telephone station set 136, to communicate with and interact with these multimedia terminals on a video teleconference in a pseudo multimedia mode. Furthermore, in accordance with this invention, the user at telephone station set 136 can leave a pseudo multimedia message with the multimedia messaging server 152 associated with the multimedia service.

As noted, MCU 124 performs the bridging functions in accordance with the H.320 protocol, which allows the audio, video and data streams from each of the multimedia terminals 101, 102, 103 and 104, which are directed by switch 122 to MCU 124, to be combined and delivered back through switch 122 and returned to each multimedia terminal. When a user at one of these multimedia terminals wants to establish a videoconference among several multimedia endusers, the originator calls a Meeting Reservation and Control System (MRCS) 125 associated with MCU 124. MRCS 125 manages meeting reservations, resource allocation, configuration, set-up and control of MCU 124. A conference identifier is then provided which is thereafter used by the user at each multimedia terminal to establish a connection to the MCU. Alternatively, a user at a first multimedia terminal can establish a multimedia connection to a user at a second multimedia terminal by directly dialing the number associated with the second terminal. In addition, a user at the first multimedia terminal can leave a multimedia message at the multimedia messaging server 152 for later retrieval by the user at the second multimedia terminal if, for example, that second terminal is busy or the user fails to answer the call.

In accordance with the present invention, a user at telephone station 136 with only POTS service, and who also has a conventional data transmitter/receiver, such as a facsimile machine or a modem-connected PC terminal, is able to participate, albeit in a reduced fashion, in a pseudo multimedia manner with one or more of the multimedia endpoints in a videoconference arrangement or in a one-to-one connection. For the user at telephone 136, audio communication is provided over a conventional local loop 131 to LEC 132, which in turn is connected over telephone trunk 130 to switch 122 within IXC 123. This audio only connection is passed by switch 122 over line 141 to a Voice Response Unit (VRU) 133, such as a Conversant® system available from Lucent Technologies, Inc., within the multimedia platform 135. As will be described, VRU 133, which is connected to an audio port 134 of MCU 124, provides the control interface for the voice-only connection to the multimedia equipment and for the user's separate data transmitter/receiver such as facsimile 137 or PC terminal 138. MCU 124 bridges the voice signal from telephone set 136 with the audio streams from each of the participant multimedia terminals, which bridged audio stream is then provided back to the participating multimedia terminals and telephone set 136.

Document sharing between the user at telephone 136 and the users at the one or more multimedia terminals 101, 102, 103, and 104, is effected through a server 146 within platform 135 that is connected over a LAN 145 to VRU 133 and MCU 124. As will be described in detail hereinafter, a document in the form of a data signal from one of the multimedia terminals to be shared with the voice-only user at telephone 136 is outputted by MCU 124 over LAN 145 to server 146 where it is stored in associated database 147. VRU 133 then establishes a telephonic connection to the voice-only user's data terminal, facsimile machine 137 or PC terminal 138, which number is retrieved from a directory database 150 associated with VRU 133. This connection is established over line 142 with switch 122, thence over trunk 130 to LEC 132, and then over either local loop 139 to facsimile 137 where it is printed, or over local loop 140 to PC terminal 138 where it is displayed. The data signal is then transmitted to either facsimile machine 137 or terminal 138 for review by the user at telephone set 136. Similarly, if the voice-only user at telephone set 136 intends to share a document with the users at the multimedia terminals in the videoconference, facsimile machine 137 or PC terminal 138 establishes a telephonic connection to VRU 133. The data signal outputted by facsimile machine 137 or PC terminal 138 is then transmitted to VRU 133, outputted over LAN 145 to server 146, and stored in database 147. During the videoconference, that data signal is retrieved from database 147 through server 146 and delivered to MCU 124 for output on the multimedia data stream to each multimedia terminal, where the document is displayed in a window on each multimedia terminal.

As previously noted, the videoconference can be established by one user arranging, through the MRCS 125, for allocation of resources for a predetermined time interval on MCU 124. Alternatively, one user may directly call another user for a two-person conference. The analog voice-only user at telephone 136 interacts with the multimedia system through the VRU 133 and its associated directory database 150. VRU 133 provides the necessary front-end control functionality that interconnects the analog voice-only user with the expanded pseudo multimedia capabilities of the present invention. When the analog voice-only user initiates of the videoconference, VRU 133 through a series of prompts and user responsive touch-tone inputs, determines the identity of that user, and the identities of the multimedia participants in the videoconference. This information is stored in the database 150 and passed to the MRCS 125 to establish the bridging functions. A conference identifier is then stored in database 150 for use in associating these participants with the particular conference and for associating those documents passed through VRU 133 to and from server 146 with the conference and the conference participants. Similarly, when the videoconference is initiated by a multimedia user, the call is sent by MCU 124 to VRU 133, to which the analog voice-only user's identity is provided. The VRU thereupon places a telephone call to the telephone station 136. Alternatively, each of the multimedia users and the analog voice-only user are given a conference code for use when placing a call at a specified time to form the video conference. The analog voice-only user then enters the conference code to the VRU 133 through prompts and touch-tone responses. VRU 133 then connects that caller to the audio port 134 of MCU 124 for the identified conference.

In a similar manner, VRU 133 uses the conference identifier to associate documents transmitted on LAN 145 between the server 146 and MCU 124 with the particular participants to the conference. Thus, when the analog voice-only user at telephone 136 is preparing to share a document with the multimedia participants for use at some later time during the videoconference, that user at telephone 136 establishes a connection from facsimile machine 137 or PC terminal 138 to VRU 133. In response to a prompt from VRU 133, the analog voice-only user then enters a conference code through facsimile machine 137 or PC terminal 138. If a code is not known, a conference identifier is retrieved from database 150 by providing, through VRU 133, the identities of the conference participants. The data signal representing the document is then transmitted by facsimile machine 137 or PC terminal 138 and forwarded by VRU 133 to server 146 over LAN 145 for storage in database 147 together with the conference identifier. During the videoconference when that document needs to be shared with the multimedia participants, the analog voice-only user signals VRU 133 by means of a touch-tone sequence through telephone 136. The VRU 133, in response to this touch-tone sequence, and from the identity of the user which is associated with the conference identifier, provides to server 146 over LAN 145, a signal to transmit the data signal representing the stored document to MCU 124. MCU 124 then bridges that data signal to each of the participating multimedia terminals.

A participant at one of the multimedia terminals may similarly want to share a document with each of the other conference participants, including the analog voice-only user at telephone 136. MCU 124, in addition to providing the document on the output data stream component of the multimedia signal transmitted to each multimedia terminal participating in the conference, outputs the data stream component of the multimedia signal over LAN 145 to server 146 for storage in database 147. By associating that received data signal with a conference identifier, and thus with the analog voice-only user, the facsimile or PC terminal telephone number of that user is retrieved from database 150. A connection is established and the data signal is transmitted to either the facsimile machine 137 or PC terminal 138.

In addition to enabling documents to be shared between the analog voice-only participant and the multimedia participants of a videoconference as described above, the present invention enables a pictorial identifier of the analog voice-only participant to be provided to the multimedia participants. This pseudo video identification is provided through an image database 151 connected to MCU 124, which contains a plurality of images of those analog voice-only users who participate in a video conferences with multimedia users. When the analog voice-only user establishes a telephonic connection with VRU 133, the identity of that user is provided to MCU 124. If an image of that user is stored in database 151, MCU 124 associates that image with the voice signal on audio port 134. MCU 124, in employing voice activated switching to determine which video stream to bridge to each multimedia terminal, retrieves the stored image of that user if the voice signal input to audio port 134 at any time is louder than the voice signal from any other conference participant. Thus, while the multimedia participants are not provided with a full-motion video image of the then currently talking analog voice-only user, a static image of that user is provided, thereby improving the facility in which the multimedia participants are able to conduct the videoconference.

As described, a static image of the voice-only user is stored in database 151. Alternatively, a video clip of the user could be stored in the database and outputted on the video stream transmitted to each multimedia terminal. Also, rather than using voice-activated switching to determine which single image to "broadcast" to each multimedia terminal, a composite image of plural conference participants could be displayed on each multimedia terminal. Thus, whenever the voice-only user's image is required, the stored static image or video clip is retrieved and displayed as part of the composite image transmitted to each multimedia terminal.

A multimedia messaging server 152, which is part of a multimedia messaging system described in co-pending patent application Ser. No. 08/357,473 filed Dec. 16, 1994, now U.S. Pat. No. 5,751,791, issued May 12, 1998, and which is incorporated herein by reference, is also connected to MCU 124. When the analog voice-only user is unable to complete a call to a multimedia terminal 101, 102, 103 or 104, due to the called terminal being busy or the failure of the called party to answer the call, a pseudo multimedia message can be left with the multimedia messaging server 152. Thus, the image stored in database 151 is transmitted on the video stream for storage to server 152, together with a voice message on the voice stream and, on the data stream, any document that the analog voice-only wants to share with the called party.

Figure 2:
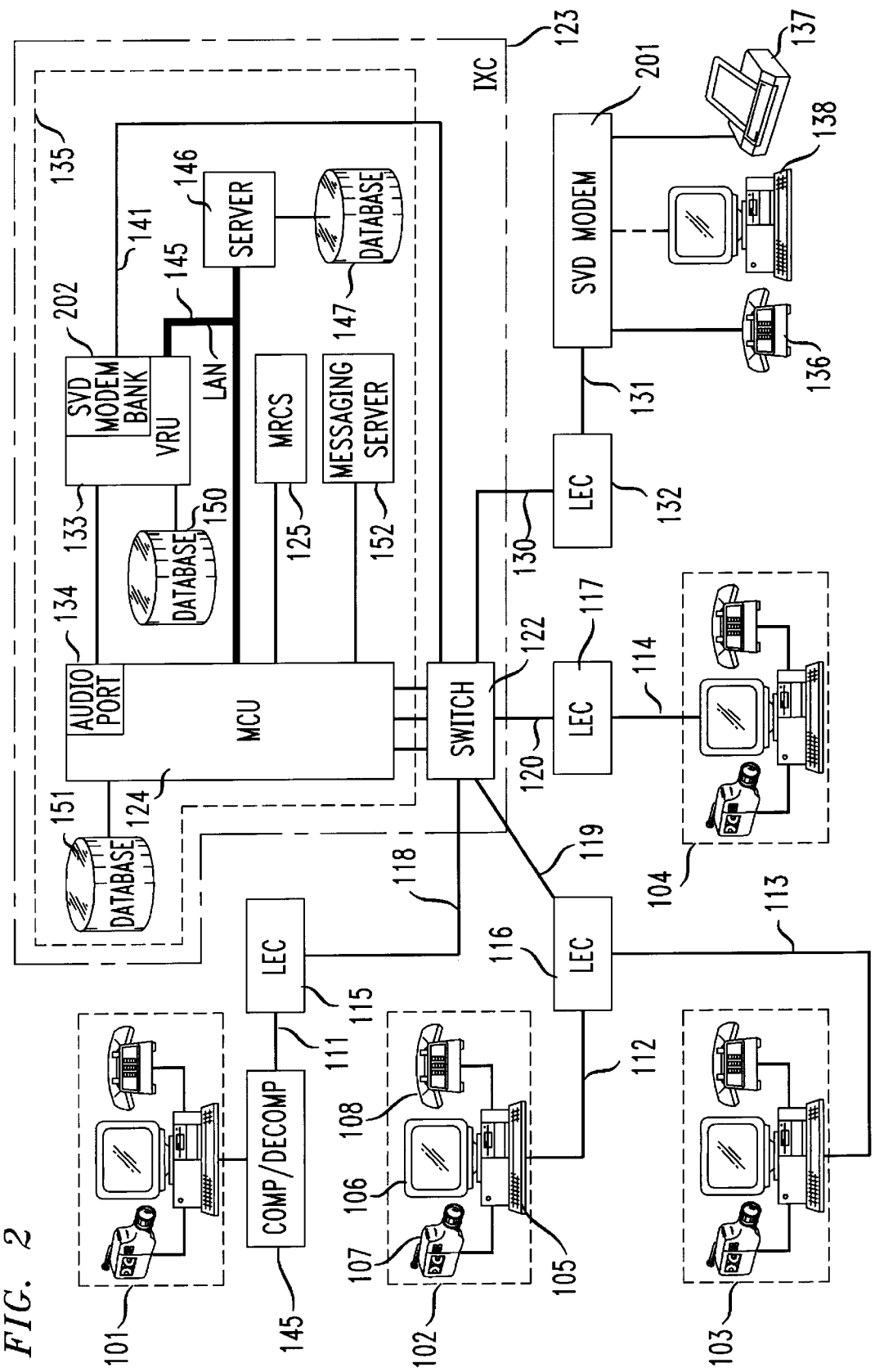
FIG. 2 is a block diagram of a simplified telecommunications network in accordance with a second embodiment of the present invention in which data signals are transmitted to and from an analog voice-only endpoint on the same telephonic connection as the voice signals.

As described hereinabove, either a facsimile machine 137 or a PC terminal 138 are connected over a telephone line which is separate from the telephone line 131 to which telephone set 136 is connected. A single telephone line could also be used for both the transmission of the voice signal and the data signal. In order to transmit or receive documents, the telephone call could be placed on hold and, using custom calling features available from the LEC 132, a second call is received or placed to transmit or receive the data signal. More preferably however, a Simultaneous Voice and Data (SVD) modem enables both the data signal and the audio signal to and from VRU 133 to be transmitted simultaneously. FIG. 2 shows an embodiment of the present invention in which the telephone set 136 and either facsimile machine 137 or PC terminal 138 are connected to SVD modem 201, which in turn is connected to telephone line 131. At VRU 133, the connection is terminated in an SVD modem within an SVD modem bank 202. The other elements of the network in FIG. 2 that are common to FIG. 1 are identified with the same numerical designations.

Figure 3:
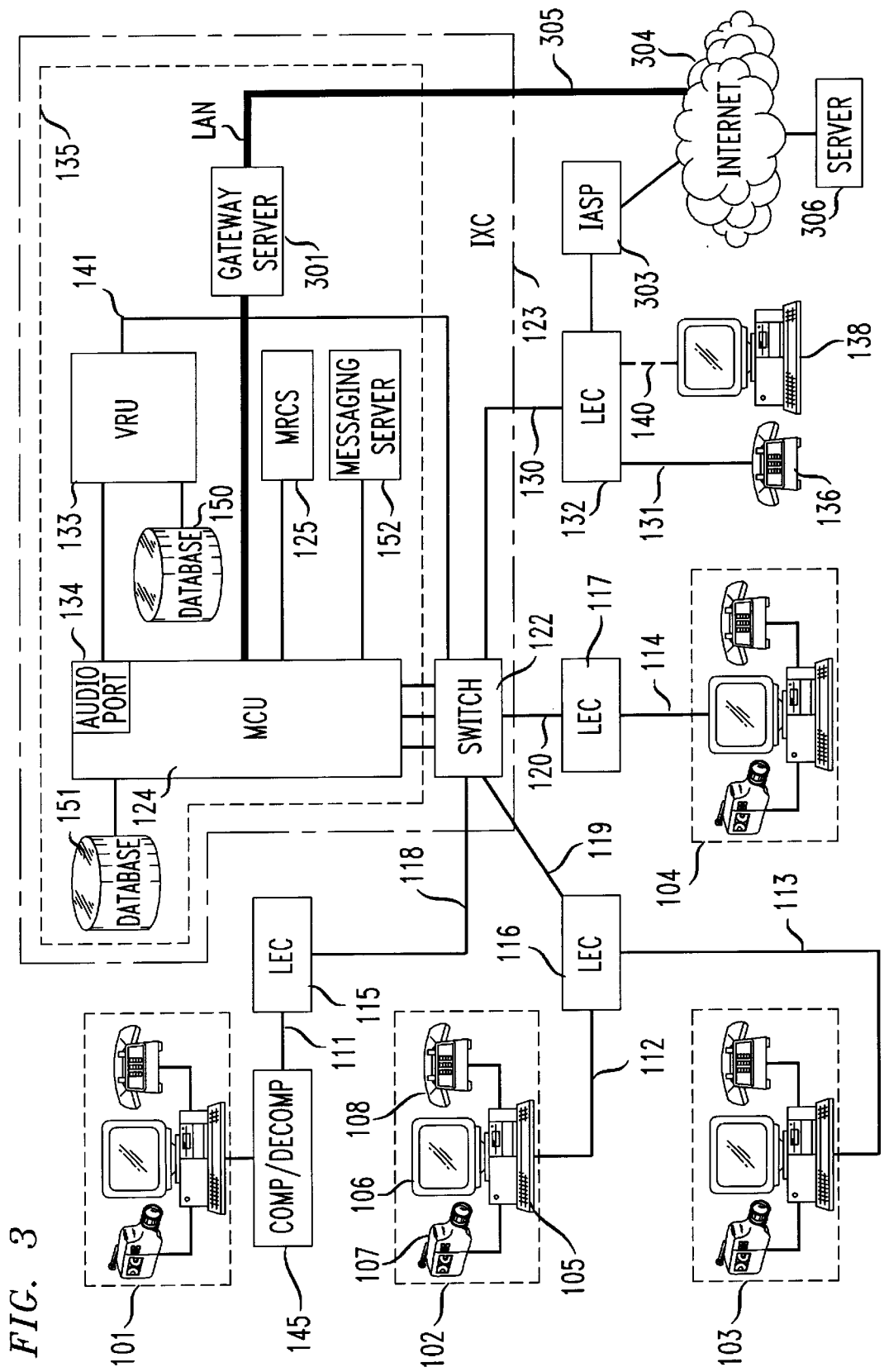
FIG. 3 is a block diagram of a simplified telecommunications network in accordance with a third embodiment of the present invention in which data signals are transmitted to an from an analog voice-only endpoint via the Internet.

As described hereinabove, the data signal to and from either facsimile machine 137 or PC terminal 138 is transmitted on a telephonic voiceband network. Alternatively, the data signal could be transmitted to and from the PC terminal 138 over the Internet. FIG. 3 shows an embodiment of such a system in which the elements common to FIGS. 1 and 3 are given the same numerical identification. In FIG. 3, a gateway server 301 is connected to the bridging MCU 124. Gateway server 301 provides Internet access to any of the H.320 terminals 101, 102, 103 and 104, connected to the bridging circuit in the manner described in co-pending patent application Ser. No. 08/547,216, filed Oct. 24, 1995, now U.S. Pat. No. 5,724,355, issued Mar. 3, 1998, which is incorporated herein by reference. As described in that application, the gateway server converts the H.320 format of the data signals from the multimedia terminals to a TCP/IP Internet format, and vice versa. In the embodiment of FIG. 3, the PC terminal 138 is connected on a telephone line 140 to an Internet Access Service Provider (IASP) 303 through LEC 132, and IASP 303 is connected to the Internet 304. Gateway server 301 is also connected to the Internet 304 via LAN 305. When a conference is established between the users at multimedia terminals 101, 102, 103 and 104, and the analog voice-only user at telephone 136 through MRCS 125, a specific Internet address is assigned by the MRCS to which shared documents are to be forwarded for this particular conference. This address can be a Uniform Resource Locator (URL) address at gateway server 301, or a URL address at another server 306 connected to the Internet 304. This address is stored by the MCU 124. When a participant at one of the multimedia terminals wants to share a document, the data signal carrying that document from its originating multimedia terminal is transmitted by MCU 124 both back to each of the other participating multimedia terminals, and to the particular URL address assigned for that conference. The analog voice-only user at telephone 136 can then retrieve that document through PC terminal 138, by providing that terminal's Internet browser with the specified URL address assigned to the conference. When the conference is established, that URL address is given to the user through VRU 133, which is provided that information by MCU 124. In a similar manner, when the voice-only user at telephone 136 wants to share a document with the multimedia participants, that document is transmitted by PC terminal 138 over the Internet 304 to the URL address assigned for the conference. Each of the multimedia participants can then access the document at the specified URL address on the Internet through gateway server 301.

The above-described embodiments are illustrative of the principles of the present invention. Other embodiments could be devised by those skilled in the art without departing from the spirit and scope of the present invention.

The invention claimed is:

1. In a telecommunications network, a method of providing a pseudo multimedia service comprising the steps of:

establishing a communications connection between a multimedia terminal and a telephone, the multimedia terminal associated with a user and operable to communicate voice, video and data signals over separate voice, video and data streams, respectively, on a bearer channel, the telephone associated with a telephone user and not having video capabilities, voice signals between the telephone user and the user at the multimedia terminal being communicated to and from the telephone over the voiceband connection and to and from the multimedia terminal over the voice stream;

establishing a communications connection between the multimedia terminal and a data terminal that is also associated with the telephone user, determining the identity of the telephone user;

using the determined identity of the telephone user, retrieving a previously stored image of the telephone user from an image database which has stored therein images of a plurality of different telephone users in association with their identities;

transmitting the retrieved image of the telephone user to the multimedia terminal on the video stream, wherein the image of the telephone user is displayed on the multimedia terminal while voice signals are being communicated between the user at the multimedia terminal and the telephone user;

receiving a data signal on the data stream from the multimedia terminal; and transmitting the received data signal to the data terminal.

2. The method of claim 1 wherein the image of the user retrieved from the image database is a static image of the telephone user.

3. The method of claim 1 wherein the image of the user retrieved from the image database is a video clip of the telephone user.

4. The method of claim 1 wherein the data signal represents a document to be shared by the user at the multimedia terminal with the telephone user.

5. The method of claim 1 wherein the data terminal is a facsimile machine.

6. The method of claim 1 wherein the data terminal is a PC terminal.

7. The method of claim 1 wherein the data signal and the voice signals are transmitted over a voiceband connection to the data terminal.

8. The method of claim 7 wherein the data signal and the voice signals are transmitted over the same voiceband connection to the data terminal.

9. The method of claim 6 wherein the PC terminal is connected to the Internet and the step of transmitting the data signal to the PC terminal comprises the steps of:

transmitting the data signal to a predetermined URL address on the Internet;

storing the data signal at the predetermined URL address; and in response to a request made through the PC terminal, transmitting the data signal stored at the predetermined URL address to the PC terminal.

10. The method of claim 1 wherein a data terminal is also associated with the telephone user and the method further comprises the steps of:

receiving a data signal from the data terminal; and transmitting the received data signal to the multimedia terminal on the data stream.

11. The method of claim 10 wherein the data signal represents a document to be shared with the user at the multimedia terminal by the telephone user.

12. The method of claim 10 wherein the data terminal is a facsimile machine.

13. The method of claim 10 wherein the data terminal is a PC terminal.

14. The method of claim 10 wherein the data signal is transmitted over a voiceband connection from the data terminal.

15. The method of claim 14 wherein the data signal and the voiceband signals are transmitted over the same voiceband connection from the data terminal.

16. The method of claim 13 wherein the PC terminal is connected to the Internet and the step of transmitting the data signal from the PC terminal comprises the steps of:

transmitting the data signal to a predetermined URL address on the Internet;

storing the data signal at the predetermined URL address; and in response to a request made through the multimedia terminal, transmitting the data signal stored at the predetermined URL address to the multimedia terminal on the data stream.

17. In a telecommunications network, a method of providing a pseudo multimedia service comprising the steps of:

establishing a communications connection between a plurality of multimedia terminals and a telephone, the each of the plurality of multimedia terminals operable to communicate voice, video, and data signals over separate associated voice, video and data streams, respectively, on a bearer channel, the telephone being one of a plurality of telephones not having video capabilities, a telephone user of the telephone being in voice communication with a plurality of users of the plurality of multimedia terminals over a voiceband connection to and from the telephone and over a video stream associated with and to and from the multimedia terminal;

determining the identity of the telephone user;

using the determined identity of the telephone user, retrieving a previously stored image of the telephone user from an image database which has stored therein images of a plurality of different telephone users in association with their identities;

transmitting, over the video stream associated with the at least one of the plurality of multimedia terminals with which the telephone user is in voice communications, the retrieved image of the telephone user to the at least one of the plurality of multimedia terminals, wherein the image of the telephone user is displayed on that multimedia terminal;

selecting at least one user from among the telephone user and the plurality of users at the plurality of multimedia terminals in accordance with the sound level of voice signals from the telephone user and from the plurality of multimedia terminals; and if a selected user is the telephone user, transmitting the stored image of the telephone user to the plurality of multimedia terminals over the video stream associated with each of the plurality of multimedia terminals.

18. The method of claim 17 wherein a data terminal is also associated with the telephone user and the method further comprises the steps of:

receiving a data signal on the data stream from the multimedia terminal; and transmitting the received data signal to the data terminal.

19. The method of claim 18 wherein the data signal represents a document to be shared by the user at the multimedia terminal with the telephone user.

20. The method of claim 18 wherein the data terminal is a facsimile machine.

21. The method of claim 18 wherein the data terminal is a PC terminal.

22. In a telecommunications network, a system for providing a pseudo multimedia service between a user associated with a multimedia terminal which is operable to communicate voice, video and data signals over separate voice, video and data streams, respectively, on a bearer channel, and a telephone user associated with a telephone not having video capabilities and associated with a data terminal, voice signals between the telephone user and the user at the multimedia terminal being communicated to and from the telephone over a voiceband connection and to and from the multimedia terminal over the voice stream, the system comprising:

a multimedia bridge connected to transmit and receive the voice, video and data streams to and from the multimedia terminal, the multimedia bridge having an audio port to transmit and receive the voice signals to and from the telephone, which voice signals are bridged to and from the voice signals on the voice stream from and to the multimedia terminal;

a database connected to the multimedia bridge, the database having stored therein previously inputted images of a plurality of different telephone users in association with their identities;

a controller connected to the multimedia bridge and in telephonic communication over the telecommunications network with the telephone and with the data terminal, the controller determining the identity of the telephone user, the stored image of the determined telephone user being retrieved from the database and transmitted by the multimedia bridge on the video stream to the multimedia terminal, wherein the retrieved image of the telephone user is displayed on the multimedia terminal while the voice signals are being communicated between the user at the multimedia terminal and the telephone user; and a server and an associated second database connected to the multimedia bridge and the controller for receiving and storing on the second database a first data signal on the data stream from the multimedia terminal and for transmitting the stored first data signal from the multimedia terminal through the controller to the data terminal, and for receiving a second data signal through the controller from the data terminal and for transmitting the second data signal from the data terminal to the multimedia bridge for transmission on the data stream to the multimedia terminal.

23. The system of claim 22 wherein the image of the telephone user retrieved from the database is a static image of the telephone user.

24. The system of claim 22 wherein the image of the telephone user retrieved from the database is a video clip of the telephone user.

25. The system of claim 22 wherein the first data signal represents-a document to be sent from the user at the multimedia terminal to the telephone user.

26. The system of claim 22 wherein the first data signal represents a document to be sent from the telephone user to the user at the multimedia terminal.

27. The system of claim 22 wherein the data terminal is a facsimile machine.

28. The system of claim 22 wherein the data terminal is a PC terminal.

29. The system of claim 22 further comprising a multimedia messaging server for storing from the telephone user for later retrieval by the user associated with the multimedia terminal, a multimedia message comprising a voice message and the stored image of the telephone user.

30. The system of claim 22 wherein the telephone user is also associated with a data terminal, the system further comprising a gateway server connected to the multimedia bridge and the Internet for receiving a first data signal on the data stream from the multimedia terminal and for converting the first data signal into a form that is compatible for transmission on the Internet, the gateway server transmitting the converted first data signal to a predetermined Web server on the Internet, and in response to a request made by the user of the multimedia terminal that is transmitted to said Web server, receiving a second data signal transmitted to said Web server over the Internet from the data terminal and converting it to a form compatible for transmission to the multimedia bridge for transmission on the data stream to said multimedia terminal.

* * * * *